United States Patent [19]
Yoshikazu

[11] Patent Number: 5,568,185
[45] Date of Patent: Oct. 22, 1996

[54] AUDIO COMMUNICATION BAND IMAGE TRANSCEIVER

[75] Inventor: Nishimura Yoshikazu, Nagasaki, Japan

[73] Assignee: Tasco Electronics Co., Ltd., Aichi, Japan

[21] Appl. No.: 333,731

[22] Filed: Nov. 3, 1994

[30] Foreign Application Priority Data

Nov. 11, 1993 [JP] Japan .................................. 5-304575

[51] Int. Cl.$^6$ ........................................... H04N 7/00
[52] U.S. Cl. ................... 348/22; 348/14; 348/17
[58] Field of Search ............ 348/22, 14, 17–20, 348/469, 424, 24, 6, 12, 13; H04N 7/00

[56] References Cited

U.S. PATENT DOCUMENTS

| | | | |
|---|---|---|---|
| 4,053,931 | 10/1977 | Hawkins et al. | 358/134 |
| 4,057,836 | 11/1977 | Munsey | 358/140 |
| 4,099,202 | 7/1978 | Cavanaugh | 358/85 |
| 4,317,130 | 2/1982 | Brown | 348/22 |
| 4,400,717 | 8/1983 | Southworth et al. | 348/22 |
| 4,516,151 | 5/1985 | Stahler | 358/14 |
| 4,564,823 | 1/1986 | Stahler | 332/17 |
| 4,651,195 | 3/1987 | Stahler | 358/14 |
| 4,652,908 | 3/1987 | Fling et al. | 348/424 |
| 4,953,196 | 8/1990 | Ishikawa et al. | 348/18 |

*Primary Examiner*—Victor R. Kostak
*Attorney, Agent, or Firm*—Poms, Smith, Lande & Rose

[57] ABSTRACT

A still video image transceiver for use across narrow-band analog voice communication channels allows still video images captured or provided by a wide variety of consumer and industrial image sources, even those of the common hetrodyne-signal type, to be transmitted over a voice communication channel, such as over a telephone line or by high frequency radio communication. The captured video image is converted to an audio band signal using a digital linear signal processing method which avoids the common problem of first having to separate the image signal of its RGB color signal components. Use of a time-base corrector is avoided, while a jitter-free image for the receiver of the image is obtained even for those images which originate with asynchronous hetrodyne-type image source. Even over analog voice communication channels of marginal operating condition, an excellent signal to noise ratio is achieved because a limiter circuit is not used prior to demodulation of the received image signal. Also, a digital linear signal decoding method is used for superior results.

19 Claims, 7 Drawing Sheets

AUDIO COMMUNICATION BAND IMAGE TRANSCEIVER

BACKGROUND OF THE INVENTION

1. Field of the Invention

The present invention is in the field of apparatus and methods to transmit an image over a narrow-band analog voice communication channel. More particularly, the present invention relates to apparatus and methods for providing a pair of users of the apparatus with full duplex voice communication; along with the capability to select a still image obtained from any one of a number of contemporary and commonly available image sources, and to transmit this still image from one user to the other user while voice communication is interrupted. Upon completion of the image transmission, receipt of the transmission, and display or storage of the image by the receiving user, full duplex voice communication is automatically restored. Many contemporary narrow-band analog voice communication facilities will support the present image transceiver apparatus and method, including common forms of the telephone (i.e., hard wired, cellular, mobile radio telephone, and others), short wave (high frequency SSB, mobile, and hand-held portable units), satellite links (INMARSAT-C, for example), and citizen's band (CB) radio.

2. Related Technology

For many years, short-wave amateur or "ham" radio operators have used a technology known as "slow-scan TV" to transmit still video images to one another over the narrow-band analog voice communication channel provided by their radio equipment. This technology uses sub-carrier FM (SCFM) modulation and demodulation, with the bandwidth of the modulated signal falling in the 1,200 Hz to 2,200 Hz audio band. In many cases, these instances of amateur short-wave radio operators transmitting video still images between one another over their radio equipment was accomplished by the use of custom-made equipment put together by the radio operators themselves. Consequently, the availability and commonality of this equipment was limited. Even though the slow-scan TV technology was in use, it was not available generally to the public, and the ability to transmit still video images over narrow-band analog telephone, or other voice communication channels, was not widely in use.

In recent years, some commercial equipment has become available to transmit images over narrow-band analog voice communication channels. Examples of this equipment is seen in U.S. Pat. Nos. 4,053,931, issued 11 Oct. 1977; 4,057,836, issued 8 Nov. 1977; 4,099,292, issued 4 Jul. 1987; 4,516,151, issued 7 May 1985; 4,564,823, issued 14 Jan. 1986; and 4,561,195, issued 17 Mar. 1987, which are all assigned to Robot Research, Inc. However, this equipment adopts the slow-scan TV technology virtually as it was used by the ham radio operators, and with the same limitations to its general use by the public. That is, conventional slow-scan TV equipment generally has the ability to accept as an image source only equipment of the broadcast type (b-camera, D1, etc), and not of the composite video type which is generally available to the public, such as common hetrodyne-type video cameras for consumer or industrial use (i.e., Beta, VHS, or 8 mm video tape recorder cameras, for example.

Further to the above, a consideration of this conventional equipment reveals that the video image signal is divided into its red/green/blue (RGB) image signal components before being modulated to form the slow-scan TV signal for transmission to another location. That is, the output of the video camera is decoded to extract the chroma signal, the luminescence signal, and the synchronization signal from the composite video signal without conversion to digital signal format. This is an analog signal separation process. The analog RGB signal is extracted, and is then converted to the digital signal format for storage in a video memory. This signal processing expedient (i.e., use of RGB signal division) imposes limitations on the conventional equipment which are not insignificant. Additional consideration of the conventional equipment shows apparently that considerable attention has in the past been given to the modulation and transmission of image signals using the slow-scan TV technology, but that little attention has been given to the demodulation of the image signal and its conversion back to a form which can be stored or displayed on commonly available equipment. Consequently, the signal demodulation technique used to a zero-crossing detection with use of a limiter circuit (i.e., quadrature detection). Also, the signal that is acquired by timing synchronized to the sub-carrier of the hetrodyne type VTR (i.e., the consumer type 8 mm, Beta, and VHS equipment) which has no compensation by a time base corrector to correct the time axis of the signal, can cause jitter of the received still image. These and other shortcomings of the conventional slow-scan TV technology are especially evident when considered in light of the marginal operating conditions which frequently apply with narrow-band voice communication channels.

That is, while speaking to one another under marginal operating conditions of a voice communication channel, users of the channel may be bothered only a little or not at all by the poor quality of the voice communication. Although there may be some loss of voice quality, tone, or fidelity, the human hearing is adaptable and can compensate somewhat for the deficiencies of the communication channel. Moreover, these users will still be able to converse with one another quite successfully. On the other hand, the quality of image transmission which can be achieved with conventional slow-scan TV equipment under such conditions will leave many users dissatisfied. Nevertheless, the image throughput rate of slow-scan television technology is generally better than that of digital image signal transmission technology over the marginal channel condition afforded by common narrow-band analog voice communication channels. That is, digital image transmission technology would require a slow transmission rate or would provide unsatisfactory results with a marginal analog voice transmission channel connecting the users of such a system. That is, conventional slow-scan TV techniques give a better throughput rate under marginal operating conditions of a narrow band analog voice communication channel than do digital image transmission techniques. Accordingly, this limited slow-scan TV technology continues in use, but is not generally used by the public at large.

SUMMARY OF THE INVENTION

In view of the deficiencies of the related conventional technology, it is a primary object for the present invention to overcome one or more of these deficiencies.

More particularly, it is an object for the present invention to provide an audio communication band image transceiver having improved compatibility with image sources in common usage today.

Another object for the present invention is to provide an audio communication channel image transceiver with improved performance of demodulation of an image signal in slow-scan TV format, and after the image signal has been transmitted via a narrow-band audio communication channel, which communication channel may be of marginal performance.

More particularly, an object of the present invention is to provide users of the apparatus with still video images transmitted via narrow-band audio communication channels, which images rival the quality of broadcast television images.

Still additionally, it is an object for this invention to provide such an audio communication band image transceiver which is small in size; light in weight; easily interfaced with a variety of commonly available image sources, audio communication, and image display and storage devices; and which is economical in its costs of construction and operation; as well as being easy for the inexperienced operator to use. In other words, an image transceiver device which is acceptable in its operation to the public, rather than merely to enthusiastic hobbyists, is desired.

Accordingly, the present invention provides a method of converting an analog image signal of slow-scan television (SSTV) format to a digital image signal, the method including steps of providing an input level controller; using the input level controller to receive the analog image signal of SSTV format and to responsively provide an output analog SSTV image signal within a selected range; providing an analog-to-digital (A/D) signal converter; using the A/D signal converter to receive the output analog SSTV image signal and to responsively provide the digital image signal.

According to another aspect, the present invention provides a method of converting an analog image signal of slow-scan television (SSTV) format to a video image signal, the method comprising steps of providing an analog-to-digital (A/D) converter, supplying the analog SSTV signal to the A/D converter to provide a digitized SSTV image signal, providing a Hilbert filter, supplying the digitized SSTV image signal to the Hilbert filter to effect a phase-shift Hilbert transform of the digitized SSTV signal providing a phase-shifted SSTV signal having a certain time delay, providing a delay unit having a delay interval substantially equal to the certain time delay, supplying the digitized SSTV image signal to the delay unit to provide a time-delayed SSTV signal; and detecting the phase difference corresponding with the angular frequency of the slow-scan TV signal according to the arctangent between the phase-shifted SSTV signal and the time-delayed SSTV signal.

Still further, and according to another aspect, the present invention provides a method of converting an analog composite video image signal to SSTV format for transmission over a narrow band-width analog communication channel, the method comprising steps of providing an analog-to-digital (A/D) converter, supplying said analog composite video image signal to said A/D converter to provide a digital composite video image signal, providing a band pass filter, supplying said digital composite video image signal to said band pass filter to provide a chroma signal, providing a first delay unit of the finite-process-time type having a process time substantially equal to said band pass filter, supplying said digital composite video image signal to said first delay unit to provide a delayed digital composite video image signal, providing a Y/C separator, and supplying said chroma signal and said delayed digital composite video image signal to said Y/C separator to provide a luminescence signal.

In each case, the present invention provides apparatus implementing the methods of the invention.

Additional objects and advantages of the present invention will be apparent from a reading of the following detailed description of a single preferred embodiment of the present invention, taken in conjunction with the appended drawing figures, which are briefly described below.

DETAILED DESCRIPTION OF THE EXEMPLARY PREFERRED EMBODIMENTS OF THE INVENTION

Figure 1A:
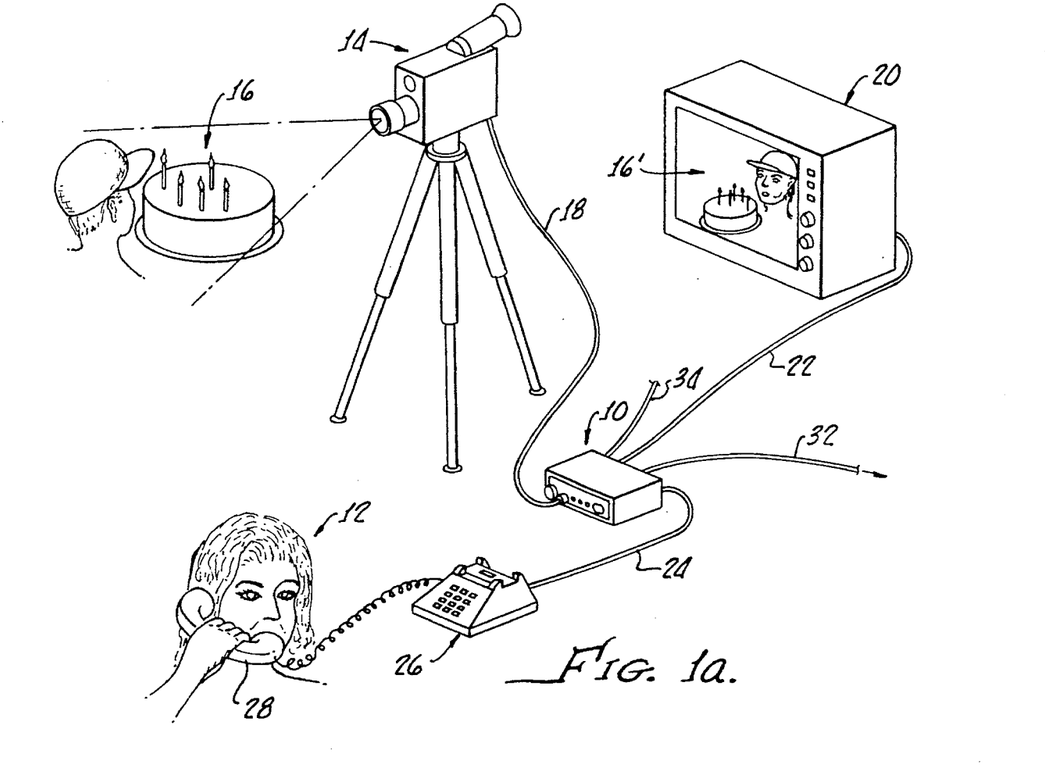
FIGS. 1a and 1b are pictographic representations of one exemplary use of a pair of the present audio communication band image transceivers by two users, one of which selects and transmits images for viewing by the other user.
Figure 1B:
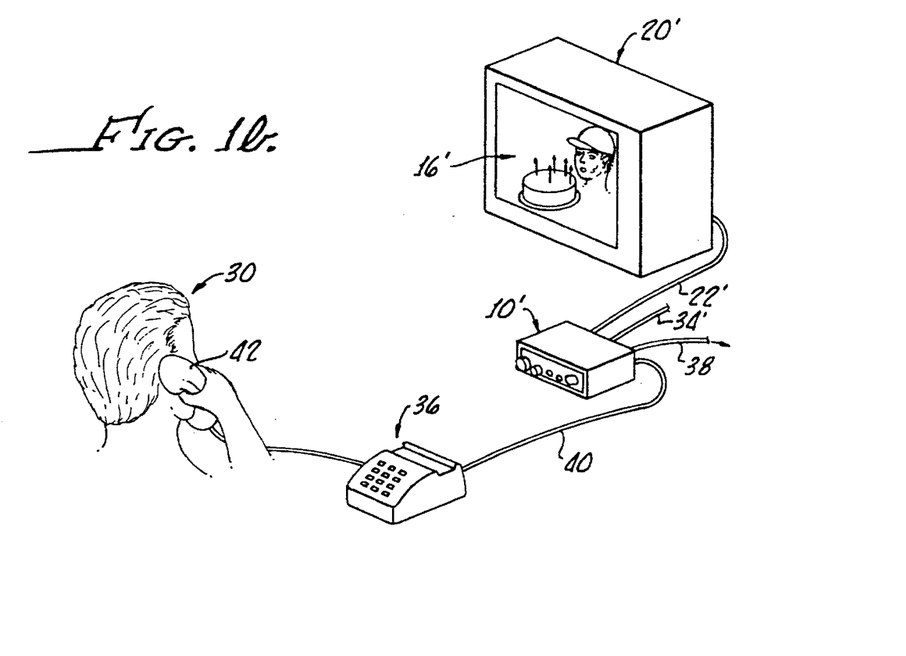

Viewing first FIGS. 1a and 1b together, an example of only one of many possible uses of audio communication band image transceivers 10 according to the present invention is pictorially illustrated. In FIG. 1a is shown a first user 12, who has positioned a video camera/video tape recorder 14, such as a common VHS or 8 mm video camera, to view and/or record a scene 16, such as a child's birthday. The user 12 has also connected the video camera 14 by a video cable 18 to the transceiver 10, and thence to a television set 20 via another video cable 22. Consequently, a still image 16' of the scene 16 which is recorded by the camera 14, may also be selected by the user 12 for viewing on the television 20.

Also connected to the transceiver 10 by a telephone wire 24 is a standard telephone 26, the handset 28 of which the first user 12 is using to speak with a second user 30, seen in FIG. 1b. The transceiver 10 is connected to the telephone system (not shown, but indicted with a termination arrow)

by a telephone wire 32. Further, the transceiver 10 receives electrical power via a power cord 34 from a 13.8 volt direct-current power supply (not shown in FIGS. 1a or 1b), such as from a battery pack, or automobile battery. Alternatively, the transceiver 10 may receive its power from a transformer/rectifier power supply circuit 34' (illustrated in FIG. 2), which receives common domestic alternating-current power via a line cord and plug (viewing briefly FIG. 2).

As is seen in FIG. 1b, the second user 30 also uses a telephone 36 which is connected to the telephone system by telephone wires 38, 40 and second transceiver 10'. The transceivers 10 and 10' are either the same or are functionally equivalent, so that they are referred to herein interchangeably. However, for purposes to this explanation, the transceiver 10 is considered as transmitting an image signal to transceiver 10'. It will be understood that these functions can be reversed, and that both transceivers are equipped to both transmit and to receive image signals. The second telephone 36 has a handset 40 by which the second user 30 may speak to the first user 12, as well as hearing the birthday party as it happens. The second transceiver 10 is connected to receive direct current power via a cable 34' and is connected by a video cable 22' to a television 20'. The users 12 and 30 enjoy full duplex telephone communication in the conventional manner except when the first user is transmitting an image to the second user, as will be explained.

However, as the activity 16 takes place and is viewed by the first user 12, this first user may command the transceiver 10 to capture a still video image of the birthday party scene 16 (i.e., the image 16' seen on television 20). After a particular still video image is captured by the transceiver 10, the user 12 may command the transceiver 12 to transmit the image to the transceiver 10' at the location of second user 30. Upon receiving this command, the transceiver 10 converts the captured image to an analog narrow-band audio format (slow-scan TV) suitable for transmission over the telephone wires 32, 38. While a selected still video image is being transmitted from transceiver 10 to transceiver 10' the audio communication between the users 12 and 30 is automatically blanked off so that they do not hear the modulated audio transmission signal in their respective handsets 28 and 42. As the transmitted still video image is received by transceiver 10', it is converted once again to a video image signal (composite video or NTSC format) for display on the television 20'. After the receipt of a particular still video image is complete, the audio communication between the users 12 and 30 is automatically restored, and the user 30 may view the still video image 16' on television 20'. The received image is refreshed by transceiver 10' for viewing by user 30 on television 20' until another image is transmitted by the first user 12. In view of the above, it is apparent that the users 12 and 30 may share both a conversation about the activities taking place at the birthday party (scene 16), as well as the user 30 being able to enjoy a succession of still video images of the activities almost at the same time they take place.

Figure 2:
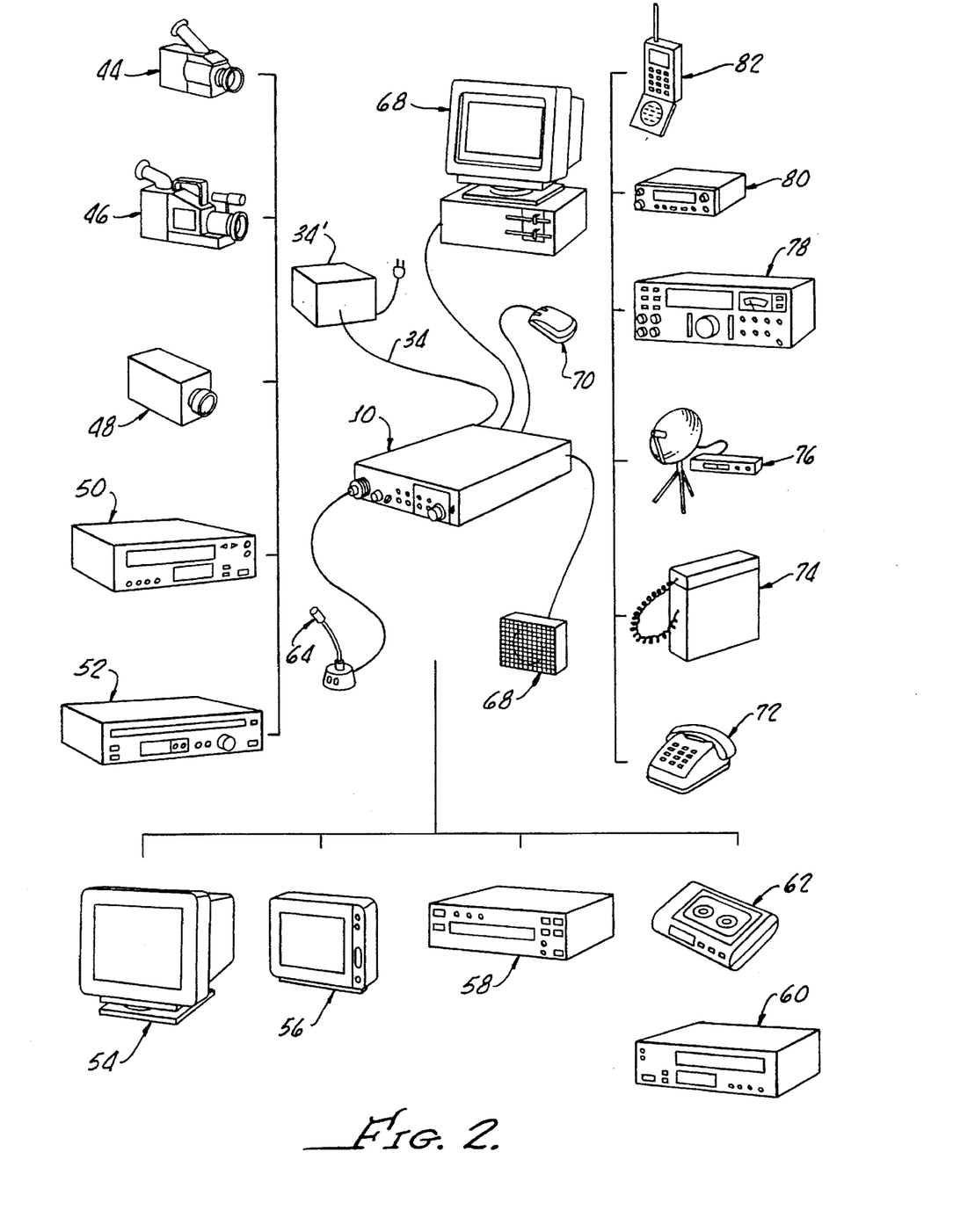
FIG. 2 is a diagrammatic representation of an audio communication band image transceiver embodying the present invention, along with a variety of common and conventional image source, image display, image storage, and audio communication equipment, which will all interface easily with the image transceiver according to the present invention.

Viewing FIG. 2, a pictorial presentation is provided which depicts many of the multitude of image source, image display, image storage, and audio band communication equipment which will easily interface with a transceiver 10 according to the present invention. As FIG. 2 also shows, the transceiver 10 may interface with a personal compute system in order to be controlled by the computer system. The transceiver 10 may also receive video image signals from and provide video image signals to the computer system.

Viewing now FIG. 2 in greater detail, it is seen that image sources which may be used to supply an image signal to the transceiver 10 include hetrodyne type image sources, such as an 8 mm camcorder 44; a VHS camcorder 46; a composite video camera 48 such as an industrial security camera; a VCR 50; or a laser disk player 52. The transceiver 10 may also receive an image signal in audio form from an audio recorder, such as from an analog tape recorder or digital audio tape recorder (not shown among the image source devices, but show among the image storage devices).

In order to display the received still video images, the transceiver 10 may be connected with any one or more of a television set 54, to a flat-panel LCD (liquid crystal display) monitor 56, or to a color video printer 58. Similarly, still video images received by the transceiver 10 may be stored on a VCR 60 (in video format), or on an audio recorder 62, such as an analog or digital audio tape recorder 62 (in audio signal format).

Still further, FIG. 2 shows that the transceiver 10 may be interfaced with a microphone 64 and with a speaker 66, to provide audio communication between the users of the transceivers. The microphone 64 and speaker 66 are substitutes for the handsets 28 and 42, of telephones 26 and 36, respectively, which were described with reference to FIGS. 1a and 1b. This drawing Figure also shows that a personal computer 68 may be used to display on its monitor either the image for transmission via transceiver 10, or the received image from the transceiver. Additionally, because many of the control inputs to the transceiver 10 are in the form of contact closure inputs, and are actually implemented by a processor (to be further described below), the transceiver 10 can be controlled in almost all of its operations by appropriate software running on the computer 68. Accordingly, the input control commands from computer 68 to the transceiver 10 may be menu-selected by use of a mouse 70. Alternatively, a user of the computer 68 may use keyboard input commands to control the transceiver 10.

Also seen in FIG. 2 is a selection of the audio band communication facilities which users may employ to talk to one another and to transmit still video images between one another by use of a pair of the transceivers 10. The use of the common hard-wired telephone system has already been discussed with reference to FIGS. 1a and 1b. Accordingly, FIG. 2 included a representative telephone 72. Other forms of analog narrow-band voice communication equipment which may be used to support the transceiver 10 are a mobile radio telephone 74, a inmarsat-c satellite voice communications link 76, a high-frequency SSB short wave radio 78, a mobile citizen's band (CB) radio 80, or a cellular radio 82 (of either the hand-held or vehicle-installed variety, for example).

Figure 3:
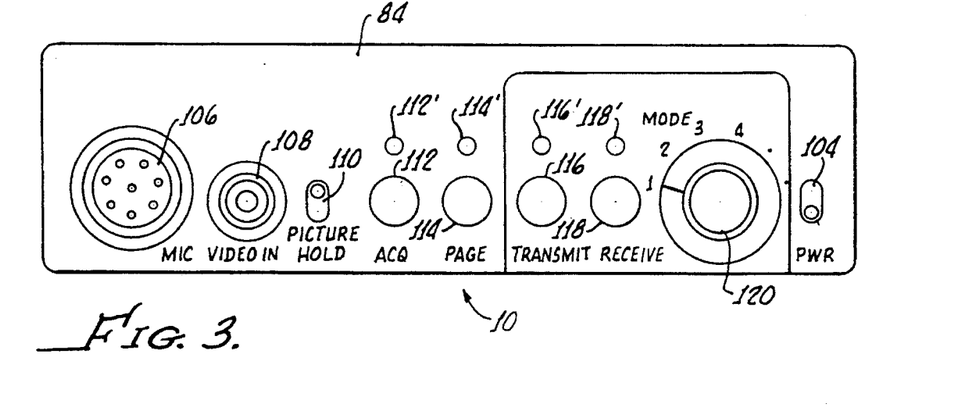
FIGS. 3 and 4 show respective front and rear views of an audio communication band image transceiver embodying the present invention.
Figure 4:
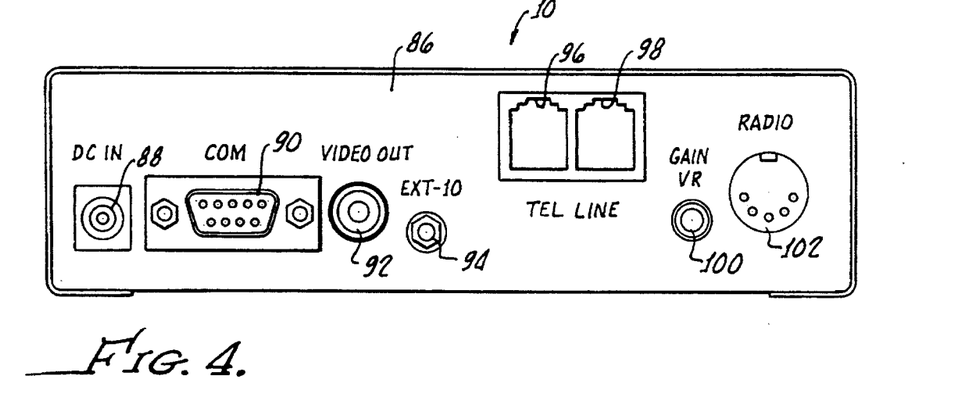

Considering now FIGS. 3 and 4, respective elevation views of the front and rear panels, 84 and 86, respectively, are provided. The rear panel 86 provides a coaxial power connector 88 at which connection of the power supply cord 34 may be effected. Also provided on the rear panel 86, is a computer cable connector 90 by which a serial communication cable (as was seen in FIG. 2) may be used to effect an input/output control and communication interface with a computer system 68. An RCA-type connector 92 on the panel 86 allows a video signal from the transceiver 10 to be supplied to a display or recording device, such as to a television or video cassette recorder (VCR). A miniature coaxial connector 94 allows input/output interface of the transceiver 10 with audio record and play back equipment, such as with an analog or DAT (digital audio tape) tape recorder and play-back device. Also, the slow scan TV image signal provided by the transceiver 10 may be provided to a transmitter, such as to a radio transmitter, via this I/O port.

Modular telephone connectors 96 and 98 allow the transceiver 10 to be interfaced with the telephone system and with a conventional corded or cordless telephone, as was explained with respect to FIGS. 1. A variable resistor control 100 is used to adjust the audio level of output from the transceiver 10 to a speaker 68, as well as allowing adjustment of the relative gain between transmission of image signals effected through a transmission device, such as a radio 78, for example. By use of this variable gain feature, a user of the transceiver can increase the gain provided by a transmitter, such as a radio 78, for improved quality of image signal transmission or reception, and reduce the audio gain by adjustment of control 100 to provide a comfortable sound level for listening to voice communications from the other user of the transceivers. A DIN-type multi-pin connector 102 allows interface of the transceiver 10 with a radio, such as the unit 78 depicted in FIG. 2.

On the front panel 84, the transceiver 10 provides a power on/off switch 104. A standard microphone multi-pin connector 106 allows a microphone, such as the unit 68 illustrated in FIG. 2, to be connected to the transceiver 10. Connection of any one of the video image sources seen in FIG. 2, and others, with the transceiver 10 is facilitated by use of the RCA-type connector 108. A picture-hold switch 110 selectively allows or disables the transceiver 10 from acquiring a new video image for transformation to slow-scan TV format for subsequent transmission to a second user of a pair of the transceivers 10. When the switch 110 is in an "off" position, the transceiver 10 is prohibited from acquiring a new video image and holds the previous image for display and future transmission. A push-button type picture acquire switch 112 allows the user of the transceiver 10 to select a video image to be transposed into slow-scan TV format by the transceiver for transmission to the second user of the transceivers. If the transceiver 10 is equipped with an optional internal memory allowing acquisition and storage of more than one video image, a page switch 114 allows the user of the transceiver 10 to page through the memory of stored images while the selected image is displayed on a television or monitor, for example, for viewing by the user. Associated LED indicator lights 112' and 114' indicate to the user of the transceiver 10 when the indicated function is active.

Once the user of the transceiver 10 has acquired, or has selected from an internal memory, if applicable, an image which the first use wishes to transmit to a second user of a transceiver 10', recalling the explanation of FIGS. 1, this first user may use a push button switch 116 to effect transmission of the selected image to the second user. A similar push button "receive" switch 118 allows the user to effect either one of two alternative control functions. If, during transmission of an image from the first user to the second user, the first user needs to interrupt the transmission (for example, so that voice communication between the users is restored), then activation of this switch 118 will interrupt the transmission. On the other hand, the user can require that the transceiver 10' receive image signals from another transceiver only in the format selected by a "mode" switch 120. Associated LED indicator lights 116' and 118' indicate to the user when the indicated function is active. The mode switch 120 is a five-position rotary switch which allows the user to select any one of the following image transmission (or reception) modes:

1) 36 second/240 lines—medium resolution format
2) 72 second/480 lines—high resolution format
3) 90 second—low resolution format (HF radio operation)
4) 94 second—low resolution format (HF radio operation)
5) Auto transmission—same format as originating station The two formats provides by switch positions 3 and 4 are uses primarily when the image signal is to be transmitted over a High Frequency (HF) radio.

Figure 5:
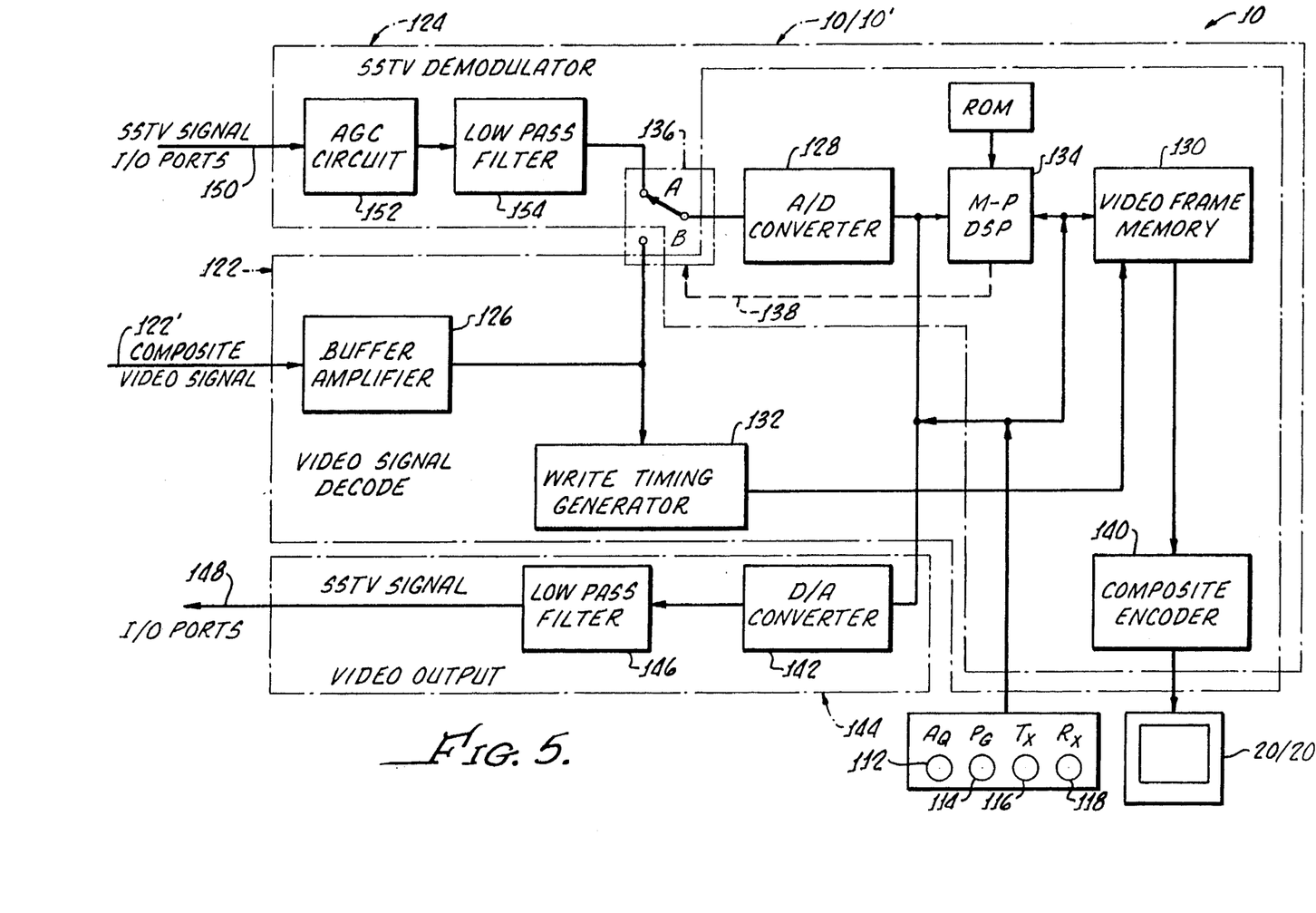
FIG. 5 presents a schematic functional block diagram of an embodiment of the present audio channel image transceiver.

Turning now to FIG. 5 for an overview of the operation of the transceiver 10, it is seen that the transceiver 10 includes two overlapped functional sections (referenced with numerals 122 and 124), which share several signal processing facilities, as will be further explained. The shared signal processing facilities, as well as other parts of the transceiver 10, may be implemented in digital processor form under software control, or may be implemented in hardware, as will be explained further. The functional section 122 serves as a video image signal decoder. Video signal decoder section 122 includes an input port connection, indicated with the arrow 122', by which an analog composite video image signal may be received from any one of the several image sources identified above with reference to FIG. 2. The input port 122' communicates the analog composite video image signal from a source thereof to a buffer amplifier 126. The input signal from the buffer amplifier 126 is converted to a digital composite video image signal at an analog-to-digital (A/D) converter circuit 128, and is stored temporarily in a video frame memory 130 according to the timing signals provided by a write timing generator circuit 132. That is, the write timing generator uses the composite image signal timing synchronization signal to produce a write signal for the digital frame memory so that the portion of the digital bits stream produced by the A/D converter circuit which corresponds to a complete image frame is stored in the memory 130.

As will be further explained in connection with a description of a signal detection function performed by a digital signal processing unit 134, a switch 136 is switched by the unit 134 to the appropriate one of its "A" or "B" positions to route an incoming analog image signal in either the analog composite video image form or in the analog SSTV image signal form to the A/D converter circuit 128. The processor unit 134 has a control interface with the switch, as is indicated by the dashed line 138. This digital signal processor 134 includes or has associated with it a processor, an accumulator, an arithmetic logic unit, read only memory (ROM), random access memory (RAM), and input/output facilities. Several signal processors are available in the market which may be programmed to implement the present invention. For example, Texas Instruments markets a digital signal processor TMS-320 which will successfully implement the functions of digital signal processor 134 as described herein. As was mentioned above, the transceiver 10 may include a video frame memory 130 which has a sufficient capacity to store only a single video image frame, or which has a capacity sufficient to store several frames (images) of the incoming video signal in its digital format produced by the A/D converter 128. In the latter case, the users may page through the stored images, as these are displayed on a connected television, for example, and may use the transceiver 10 to transmit selected images to another user.

The digital signal processing unit 134 may alternatively be programmed to transmit a pre-signal, such as a tone pulse, when the user 12 activates the transmit switch of the transceiver 10 to transmit an image signal to the transceiver 10'; and to respond to the receipt of such a pre-signal, by shutting off the duplex voice communication between the users. The processor 134 of the receiving transceiver 10' would then command switch 136 to position "A" in preparation for the receipt of a SSTV image signal in analog format from the transmitting transceiver 10. The "B" position of switch 136 is the default position, and allows a transceiver to receiver analog composite video image signals from a source thereof. Alternatively, this function may be manually accomplished by the users. That is, the "receive" switch of the receiving transceiver may be activated by the second user to allow reception of an image signal and to cut off voice communication. When the receipt of the image signal is completed, the receiving transceiver 10' will restore voice communication.

As the incoming analog composite video image signal is converted to a digital format in preparation for storage in the video frame memory 130, this memory unit passes along the digital signal to a composite video encoder circuit 140. The circuit 140 transforms the digital image signal once again into an analog image signal, which is outputted via an output port referenced on FIG. 5 with the numeral 22, recalling from the description of FIG. 1a, that the transceiver 10 is interfaced with a television or other image display device by a video cable 22. As the user 12, recalling the description of FIG. 1a, watches a scene and anticipates that an image should be saved, the user activates the push button switch 112, recalling FIG. 3. Activation of the acquire switch 112 by the user 12 causes the linear digital signal processing unit 134 to cause memory unit 130 to temporarily store in digital format the next subsequent complete frame of video signal received by the transceiver 10, which complete frame is displayed on television 20 so that the user 12 can see the image which is ready for transmission.

When the user 12 selects an image which is acceptable to be transmitted to the second user 30 by activation of the transmit switch 116, the digital signal processor 134 acquires the digital image signal from video frame memory and decodes this image signal into its component RGB signal, which is then modulated to produce a digitized slow-scan television (SSTV) signal. This digitized SSTV signal is supplied by the digital signal processor 134 to a digital-to-analog (D/A) converter 142. The converter 142 is part of an output portion of the transceiver, which section is referenced on FIG. 5 with the numeral 144. This output section 144 also includes a low-pass filter 146 and an output port 146. Recalling the description above of FIG. 4, it will be understood that the output port 146 encompasses all of the computer port 90, video port 92, external I/O port 94, telephone line connections 96,98, and radio multi-pin connector 102. That is, the modulated analog SSTV image signal provided by the transceiver 10 in the audio frequency range may be transmitted to the second user 30 via any of the communication facilities, and others, indicated on FIG. 2.

On the other hand, when a transceiver according to the present invention (i e., transceiver 10', as seen in FIG. 1b) is used by the second user to receive and display still video images, the SSTV analog image signal from a transmitting transceiver 10 is received via an input port 150. Once again, this input port encompasses the computer port 90, video port 92, external I/O port 94, telephone line connections 96,98, and radio multi-pin connector 102. As a consequence, the transceiver 10' may receive an analog SSTV image signal from any of these devices, and from other devices as well. Input port 150 communicates the received analog SSTV image signal to an automatic gain control circuit (AGC) 152, which is part of a SSTV demodulator portion 124 of the transceiver 10'. This automatic gain control circuit 152 provides an output analog SSTV image signal within a certain selected range for the signal. The output analog SSTV image signal from the AGC circuit 152 is provided to a low-pass filter anti-aliasing circuit 154. The anti-aliasing circuit 154 rejects aliasing signals from the output analog SSTV signal received from AGC circuit 152. Consequently, the anti-aliasing circuit 154 provides an output analog SSTV image signal free of aliasing signals to the A/D converter circuit 128. As before, the digital signal processor 134 performs a signal detection function, and in this case controls the switch 136 to its "A" position via control interface 138 so that the output analog SSTV image signal free of aliasing signals is passed to the A/D converter 128. A/D converter 128 provides an output digital SSTV image signal free of aliasing signals to digital signal processor 134.

In order to provide both a digitized video image signal for storage in the video frame memory 130 and for display or storage, for example, on a television such as the television 20' depicted in FIG. 1b, the digital signal processor 134 performs a digital decoding of the output digital SSTV signal free of aliasing signals which is provided by the A/D converter 128. In order to provide an explanation of this decoding process performed by the digital signal processor 134 which is easier to understand than a rigorous mathematical presentation of this digital decoding, FIG. 7 provides a block diagram and signal flow schematic allowing the signal decoding process to be explained as though it were being conducted using discrete components.

Figure 7:
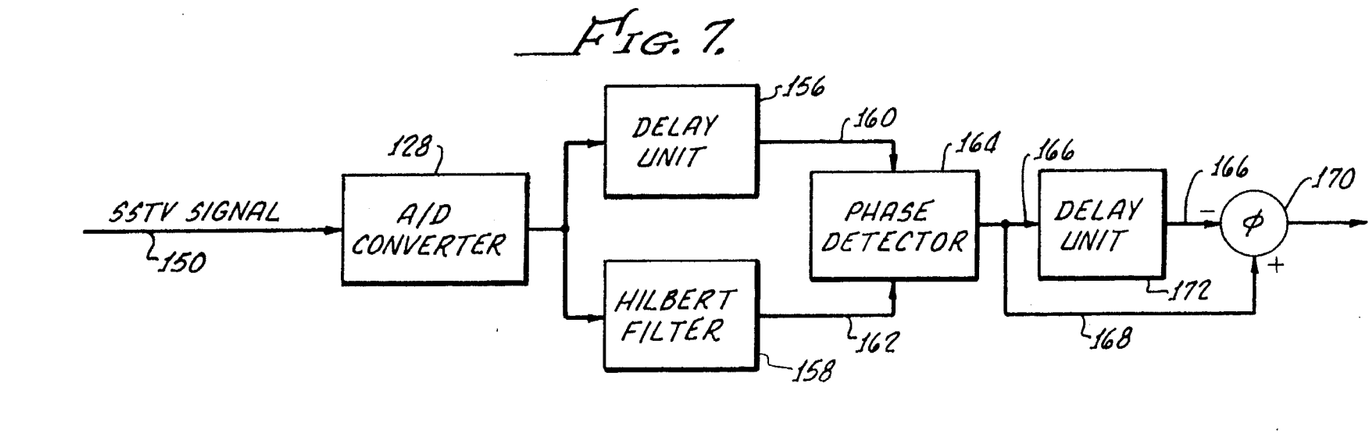
FIG. 7 presents a functional schematic block diagram of a portion of an alternative embodiment of an audio channel image transceiver embodying the present invention, and which in other respects may also be the same as the embodiments of FIGS. 1–5, or of FIG. 6.

FIG. 7 also illustrates that the decoding of the SSTV signal may in fact be performed by discrete hardware component devices operating in accord with the signal processing schematic illustrated by this Figure, rather than by a digital soft-ware driven processor operating as a signal decoder. The hardware-based signal decoder of FIG. 7 is a substitute for the processor-based digital signal decoder shown in FIG. 5. Accordingly, FIGS. 5 and 7 illustrate alternative embodiments of the invention which are the same with the exception of using either digital processor-based signal decoding or decoding effected using discrete hardware components. However, those ordinarily skilled in the pertinent arts will appreciate that contemporary high-speed, low-cost integrated circuit signal processors, such as the Texas Instruments TMS-320, have a significant cost advantage over using discreet hardware circuit devices to perform the necessary signal decoding. The digital processor-based signal decoder can also perform other functions under software control, such as performing the signal detect function previously described, (and can interface with an external digital device, such as a personal computer 68, seen in FIG. 2), unlike a decoder using discreet components. Those ordinarily skilled in the pertinent arts will also understand how to program a digital signal processor in view of the functions which are explained below as being necessary in view of the analog circuit as described.

Viewing now FIG. 7 in greater detail, the output digital SSTV signal free of aliasing signals, which is provided by the A/D converter 128, is passed to both a first delay unit 156 and to a Hilbert filter 158. The delay unit 156 effects a selected delay equivalent to the delay necessary for operation of the Hilbert filter 158. This Hilbert filter 158 effects a well-known Hilbert phase-shift transform on the output digital SSTV free of aliasing signals which was received from the A/D converter 128. The resulting first delayed digital signal and Hilbert transformed digital signals from the unit 156 and filter 158, respectively, are applied via respective interfaces 160 and 162 to a first phase detector 164. This phase detector 164 provides a phase difference signal having a value of the arctangent ($Tan^{-1}$) via a pair interfaces 166, 168 to a second phase detector 170. The one interface 166 includes a second delay unit 172. This second delay unit performs a Z-transform over the input signal. The second phase detector 170 performs a subtraction of the output signal from the second delay unit 172 from the first phase detector 164, where the change of signal level per unit time is calculated to decode the SSTV signal.

In order to further explain this signal decoding process, assume that the signal applied to the Hilbert filter 158 is represented by Y=Asinωt, where A represent amplitude, ω represents angular frequency, and t represents time. Assume further that the output signal from the Hilbert filter 158 is X. Then as a result of the Hilbert transform, X is only 90 degrees different in phase compared to Y. X can be expressed as X=cosωt. The ratio of Y/X=tanωt, and ωt=tan$^{-1}$(Y/X). Now assume t$^0$ is the standard time, and if we obtain the phase angle change Δω, versus the time change Δt, then the following formula applies:

$$\Delta\omega = \omega(t^0 + \Delta t) - \omega t^0 = \omega \Delta t = \tan^{-1}(Y^1/X^1) - \tan^{-1}(Y^0/X^0)$$

Here, $Y^1$, and $X^0$, represent the signal Y and X at time $t^0$. Since the Δt is a constant, the above Δω (output of first phase detector 164) is a proportion to the angular frequency ω. Therefore, in the phase detector 170, the SSTV signal is demodulated by detecting the amount of signal change per unit time against the output signal of the phase detector 164. Of course, this signal decoding can be performed by the digital signal processor 134 under software control, as is illustrated in FIG. 5.

Figure 6:
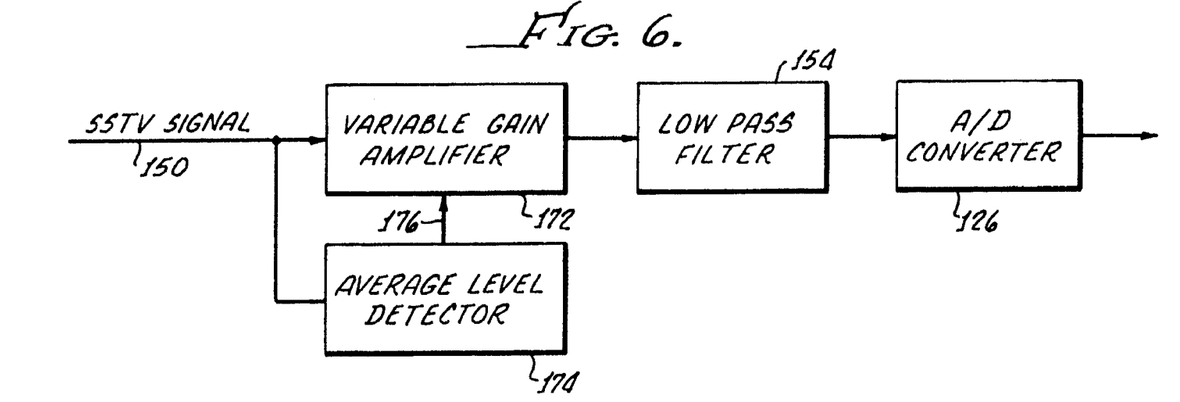
FIG. 6 presents a schematic functional presentation of a portion of another embodiment of the present invention. This embodiment may be the same as the embodiment of the audio channel image transceiver shown by FIGS. 1 . 5 with the exception of the circuit portion shown.

FIG. 6 illustrates another alternative embodiment of the invention, in which the AGC 152 of the embodiment seen in FIG. 5 is replaced by a voltage-controlled variable-gain (VCVG) amplifier 172. The incoming SSTV signal received via input port 150 is supplied both to the VCVG amplifier 172, and to an average level detector circuit 174. The average level detector circuit 174 provides a voltage output signal which is a function of the average or RMS value of the input analog SSTV signal. This output voltage signal from the average level detector circuit 174 is supplied to the VCVG amplifier 172 via an interface 176. Thus, the VCVG amplifier is controlled to provide an output analog SSTV signal to the low-pass, anti-aliasing filter 154 which is maintained in a selected signal range. As is schematically shown on FIG. 6, the output of the low-pass, anti-aliasing filter 154 is supplied to the A/D converter 126 via the switch 136. The remainder of the embodiment illustrated by FIG. 6 may be the same as that illustrated by FIG. 5.

Figure 8:
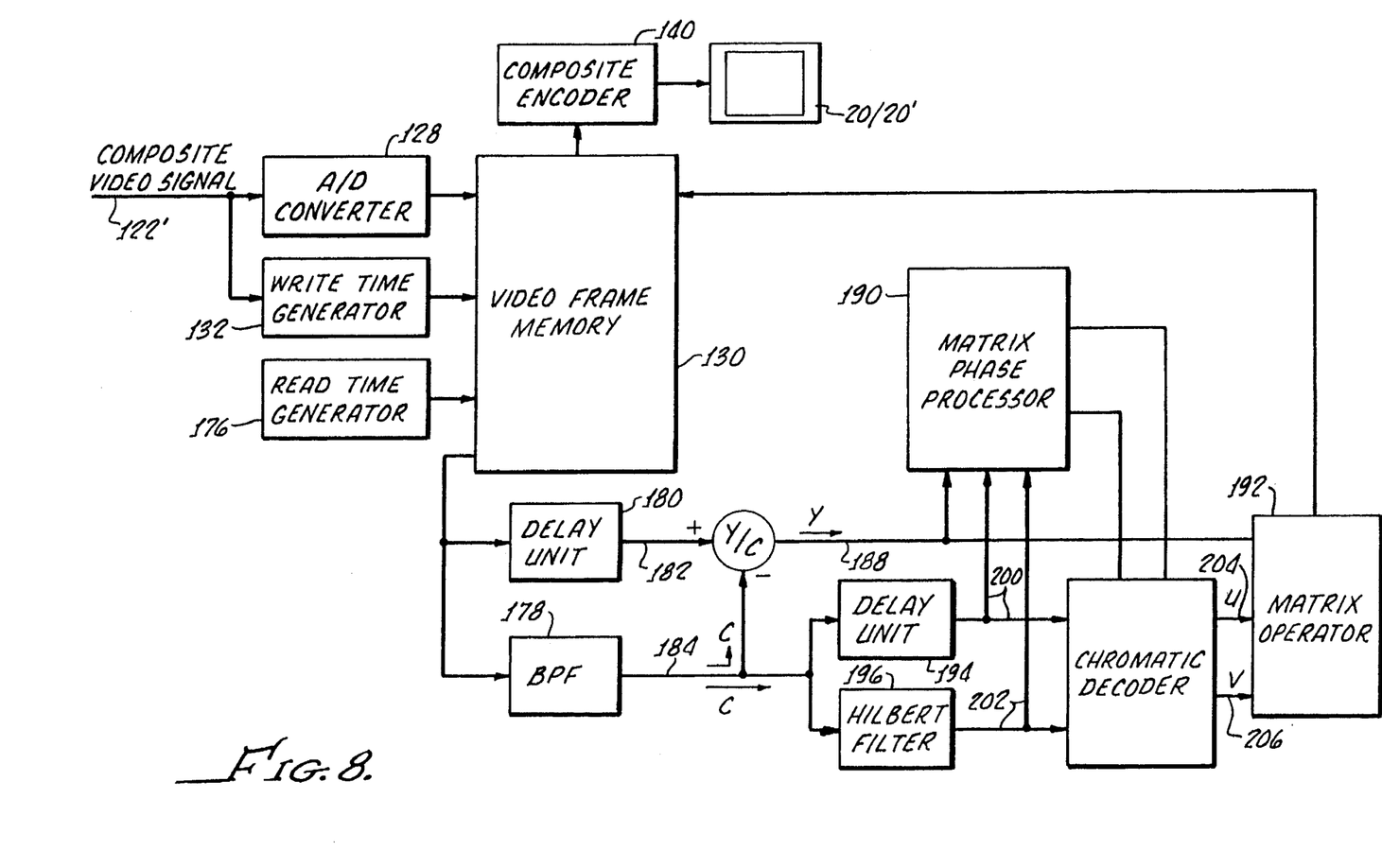
FIG. 8 is a schematic functional block diagram of a portion of yet another embodiment of an audio band image transceiver embodying the present invention, and which in other respects may be the same as the embodiment of FIGS. 1–5, of FIG. 6, or of FIG. 7.

FIG. 8 illustrates yet another alternative embodiment of the invention in which the processing of a composite video image signal received from one of the image sources illustrated in FIG. 2 is carried out by hardware rather than by a digital signal processor 134, as is depicted in FIG. 5. That is, the remainder of the embodiment of FIG. 8 may be the same as that of FIG. 5, with the exception that the function of the digital signal processor 134 in receiving, processing, and storing, a composite video image signal is replaced with hardware components (which will be described), and that these hardware components are interfaced with the remainder of the transceiver 10 as depicted. Once again, this explanation of how the digital signal processing may be carried out with hardware components allows an understanding of the functions which digital signal processor 134 carries out under software control, and is easier to follow than would be a rigorous mathematical presentation of the digital signal processing within processor 134. Those ordinarily skilled in the pertinent arts will know how to program a digital signal processor, such as the Texas Instruments TMS-320, in view of the functions it is to perform as explained by reference to FIG. 8. It will be noted that the embodiment of FIG. 8 still includes a processor, which can be programmed to carry out the control functions and signal detection functions of the transceiver 10.

Attention now to FIG. 8 illustrates that the composite video image signal received via input port 122' and passed through buffer amplifier 126 (depicted on FIG. 8 with a dashed interface line), is supplied to the video frame memory 130. The recording of the received signal in video frame memory 130 (in digital format after its passage through A/D converter 128), is under the control of the write timing generator 132, as was the case with the first embodiment depicted in FIG. 5. Consequently one or more complete video image frames, dependent upon the size of the video frame memory provided with a particular transceiver 10, may be stored in the video frame memory 130 preparatory to the first user deciding to transmit an image to the second user. A read timing generator 176 enables the stored digital image signal to be read out in its proper sequence of digital bits. When the first user activates the transmit switch after having selected an image for transmission to the second user, the stored digital composite video image signal is obtained from video frame memory 130 preparatory to its being transcoding into analog SSTV format for sending over the voice communication channel to the second user.

In order to obtain both a luminescence signal "Y", and a chroma signal "C", which is modulated by the color subcarrier of the image signal (in digital composite video image signal format as it is recalled from the video frame memory 130), a band pass filter (BPF) 178 of the finite-response-time type is provided. A delay unit 180 provides a delay which is the same as that of the BPF 178. The band pass filter extracts the chroma signal portion "C" of the composite video image signal. As a result, the image signal from memory 130 applied to these units 178 and 180 provides both a time-delayed digital image signal from the video frame memory, which is supplied via interface 182; and its chroma signal "C", which is supplied via an interface 184. These two signals are time synchronized because of the equal delays of the units 178 and 180, and are arithmetically applied to a Y/C separator 186 simultaneously. The Y/C separator 186 provides a luminescence signal "Y" via an interface 188. This luminescence signal "Y" is provided both to a processor-type phase calculator 190, and to a matrix operator 192.

On the other hand, the chroma signal "C" is also supplied to a delay unit 194, and to a Hilbert filter 196. The delay unit 194 effects a selected time delay equal to the processing time of the Hilbert filter 196. As a result, the phase calculator 190 and a chromatic decoder 198 both receive a time-delayed chroma signal via an interface 200. The phase calculator 190 and chromatic decoder 198 also receive a phase-shifted signal via an interface 202, which phase-shifted signal has been shifted 90 degrees relative to the chroma signal from band-pass filter 178 by the Hilbert filter 196, and is in time-synchronization with the time-delayed chroma signal from delay unit 194. The chromatic decoder 198 in response provides two color difference signals "U" and "V" to the matrix operator 192 via respective interfaces 204 and 206.

Considering now the theory of operation of the circuit depicted, an analog composite video signal is applied externally to the input of the decoder at input port 122'. This signal is converted to the digital format at the A/D converter 128. A timing signal for writing complete frames of the video signal into memory 28 is provided by write timing generator 132. As will be explained, when a processed and stored video image frame is to be obtained from the memory 130, the read timing generator provides a timing signal allowing the digital bits of the image signal to be extracted in their correct sequence. The signal written into the video frame memory contains not only a luminescence signal, but also the synchronization signal and burst color signals. The sampling frequency and phase of the signals are not corresponding to the sub-carrier of the composite video signal. That is, these signals are processed asynchronously. This allows the hetrodyne type of video tape recorders and cameras to be used as image sources for the transceiver 10. The luminance signal "Y" is obtained by the Y/C separator 186 by subtracting the chroma signal from the composite video signal. The chroma signal itself is phase shifted 90 degrees by the Hilbert filter 196, while a time-synchronized (i.e., delayed by an interval equal to the processing time of the Hilbert filter 196) chroma signal is provided by delay unit 194. Values of the sine and cosine of the chroma signal and the phase shifted signal from the Hilbert filter 196 are provided by chromatic decoder 198. These signals represent the burst phase and sampling phase of the video image signal. The matrix operator 192 obtains RGB component signals from the video image signal by matrix operation on the luminescence "Y", and color difference signals "U" and "V".

Figure 9A:
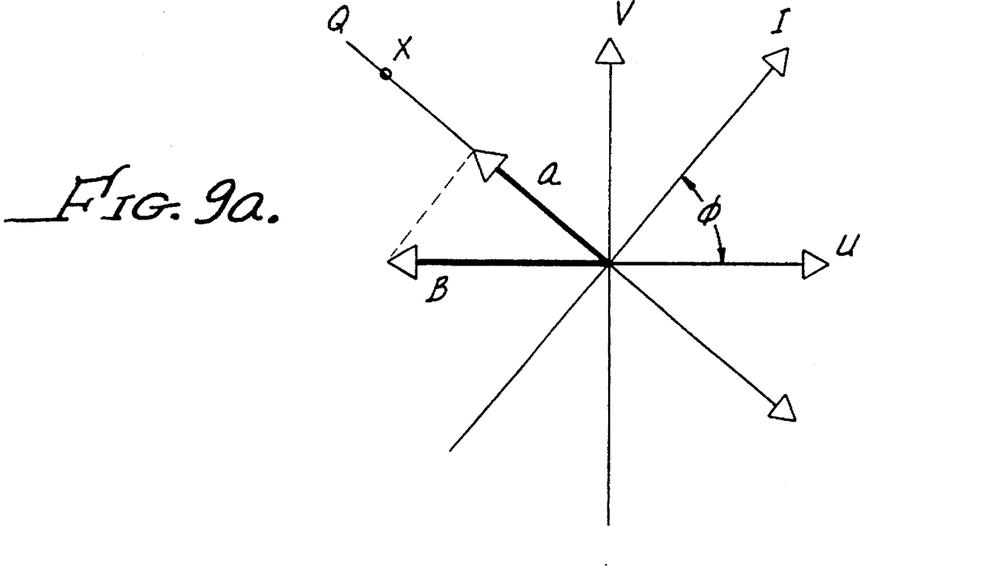
FIGS. 9a and 9b present vector diagrams illustrating a signal processing effect used by the present image transceiver to obtain color difference signals.
Figure 9B:
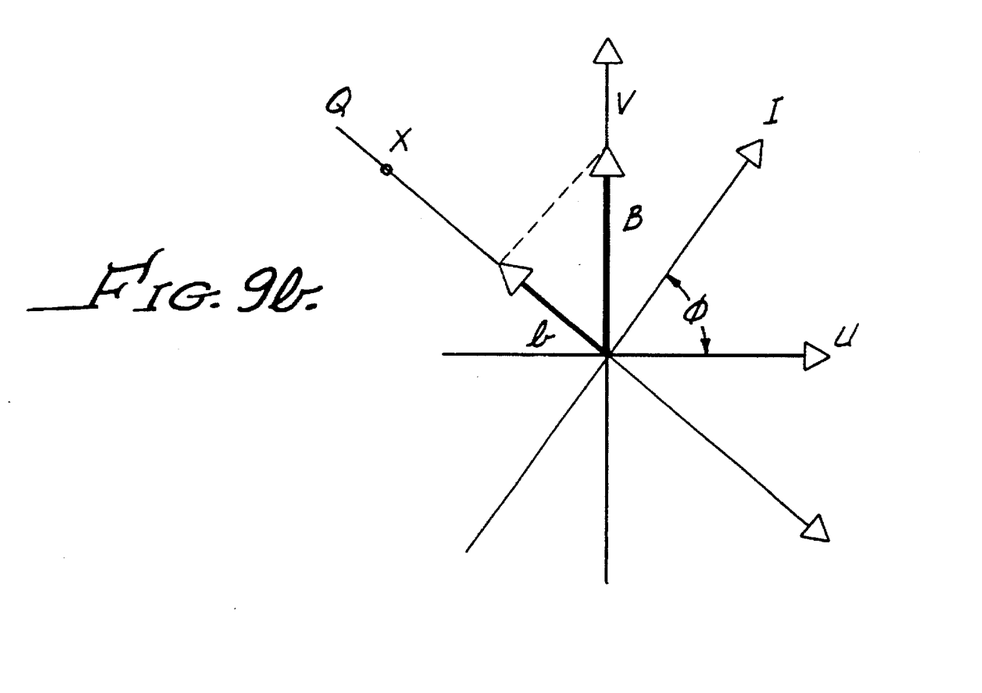

For example, if the A/D converter 128 were to perform sampling of the incoming video composite signal by the forth overtone frequency of the sub-carrier frequency, the sampling signal would not be synchronous to the sub-carrier. The phase angle is therefore not a constant but changes with time against the phase of the burst signal. FIG. 9a shows an example of this phase angle diagram. On FIG. 9a, "B" represents the burst signal, and "a" represents the component of the burst signal on the "Q" axis. When this video signal having a phase angle against the burst signal phase angle is passed through the Hilbert filter 196, the phase angle of the burst signal is shifted 90 degrees against the original phase angle, as was shown in FIG. 9a. As is shown in FIG. 9b, assume that the sampling phase for the signal is located at "X" on the "Q" axis, the component of the burst signal "a", "b", which is transposed to the coordinate system Q,I, is represented by a =B sin φ, and b=B cos φ. Therefore, sin φ=a/B, and cos φ=b/B. But because of the relationship: B= $\sqrt{a^2+b^2}$, the following equations are formulated: sine φ=a/$\sqrt{a^2+b^2}$, and cosine φ=b/$\sqrt{a^2+b^2}$. Thus, sine φ, and cosine φ, are obtained. In this case, the sine φ, and cosine φ, are obtained from the phase calculation in the phase calculator 190 over the luminescence signal Y, time-delayed chroma output signal of the delay unit 194, and the 90-degree phase-shifted output signal of the Hilbert filter 196. The chroma signal components are obtained in the same way by applying the Hilbert transform.

In order to extract the components of the luminescence "Y", and color difference signals, "U" and "V", respectively, the following process is used. The I, Q axis of FIG. 9 must rotate an angle φ, so that the components of "U", and "V" can be obtained. Assume that the sampling value is X on the I axis. Then, the sampling value is "Y" on the Q axis, and the vector "Z" that represents the chroma signal can be expressed as: Z=X+iY, by imaginary unity. That is "i" is the imaginary number $\sqrt{-1}$. Thus, z=Z(cos (−φ)+i sin (−φ)). This relationship can also be developed by combining the vector amount Z, and the formula to express z:

$$x+iy=(X \cos φ+Y \sin φ)+(Y \cos φ−X \sin φ)$$

This relationship can be converted to and handled in the matrix form:

$$\begin{bmatrix} x \\ y \end{bmatrix} = \begin{bmatrix} \cos φ, & \sin φ \\ -\sin φ, & \cos φ \end{bmatrix} \begin{bmatrix} X \\ Y \end{bmatrix}$$

Sin φ, and cos φ, are obtained as an output of the phase calculator 190 as described above. "X" and "Y" are obtained as outputs of the Hilbert filter 196, and delay unit 194. The chromatic decoder 198 performs the matrix operation as described above using the matrix operator 192. Thus, a "Z" transform is conducted for the chroma signal. The resulting SSTV image signal (digital) is stored in the video frame memory, preparatory to transmission to the second user. This still video image is displayed on the television of other display device of the first user 10 after the acquire switch 112 is activated. When the first user transmits the still video image to the second user, the stored composite video image in digital signal format is obtained from the video frame memory 130 and as transcoded to and transmitted in SSTV audio analog signal form to be temporarily stored pending completion of signal processing, and for subsequent transmission to the second user 30. The completed image signal in SSTV format (digital) is obtained from the video frame memory. Conversion from digital to analog form of the SSTV image signal preparatory to transmission over the analog narrow band voice communication channel is accomplished in the D/A converter 142, recalling FIG. 5. Receipt and decoding of the received analog SSTV signal by the receiving transceiver 10' has already been discussed above.

Because of the present signal processing method, a stable and jitter-free image is obtained by the receiving transceiver 10' even under marginal operating conditions of the audio communication channel. And this is without the use of a time-base corrector, since the sampling signal is not corresponding to the burst signal of the composite video image signal. Because in theory the horizontal scanning frequency of the hetrodyne type of video signal is not stable, the image could jitter if the sampling frequency is synchrohized to the synchronization signal in such video signals. The image could jitter because the decoding could recover the image with a different number of samplings than the number of horizontal lines than the image should have. The image signal processing of the present invention avoids such image jitter even with an image signal of the hetrodyne type. Further, image jitter is avoided without adopting a time base corrector to perform the compensation on the time axis of the image signal.

Image jitter could easily happen also with an audio communication channel under undesirable operating conditions (i.e., resulting in a received signal with an undesirably high noise content in comparison to the level of the received signal). Avoiding the use of the usual signal limiter operating on the received analog SSTV image signal, and instead using AGC control circuitry according to FIG. 5, or the voltage-controlled, variable-gain amplifier according to FIG. 6, improves signal demodulation under marginal operating conditions of the communication channel. An excellent signal-to-noise ratio is achieved. Also, the present invention does not use the traditional "zero-crossing" demodulation. The present linear digital signal processing for demodulation of the image signal from the SSTV audio-range signal gives improved image quality without jitter. Additionally, it is not necessary with the present invention to separate the RGB signals before the digital processing of the composite video image signal to a SSTV format for transmission. The present invention allows the incoming composite video signal to be stored in digital form preparatory to conversion to SSTV form by digital signal processing, and preparatory to conversion to analog SSTV format for transmission.

While the present invention has been depicted, described, and is defined by reference to several particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

I claim:

1. A method of converting an analog image signal of slow-scan television (SSTV) format to a digital image signal, said method comprising steps of:

providing an input level controller;

using said input level controller to receive said analog image signal of SSTV format and to responsively provide an output analog SSTV image signal within a selected range;

providing an analog-to-digital (A/D) signal converter;

using said A/D signal converter to receive said output analog SSTV image signal and to responsively provide said digital image signal;

providing a Hilbert filter; and supplying said digital image signal to said Hilbert filter to provide a phase-shifted digital signal.

2. A method of converting an analog image signal of slow-scan television (SSTV) format to a video image signal, said method comprising steps of:

providing an analog-to-digital (A/D) converter;

supplying the analog SSTV signal to said A/D converter to provide a digitized SSTV image signal;

providing a Hilbert filter;

supplying said digitized SSTV image signal to said Hilbert filter to effect a phase-shift Hilbert transform of said digitized SSTV signal providing a phase-shifted SSTV signal having a certain time delay;

providing a delay unit having a delay interval substantially equal to said certain time delay;

supplying said digitized SSTV image signal to said delay unit to provide a time-delayed SSTV signal; and detecting the phase difference corresponding with the angular frequency of said slow-scan TV signal according to the arctangent between said phase-shifted SSTV signal and said time-delayed SSTV signal.

3. The method of claim 2 further including the steps of:

providing a phase detector;

supplying said phase-shifted SSTV signal to said phase detector;

providing a second delay unit;

supplying said phase-shifted SSTV signal to said second delay unit to provide a time-delayed phase-shifted SSTV signal having a delay therein substantially equal to that of said phase detector; and performing a Z transform using said phase-shifted SSTV signal and said time-delayed phase-shifted SSTV signal.

4. A method of converting an analog composite video image signal to SSTV format for transmission over a narrow band-width analog communication channel, said method comprising steps of:

providing an analog-to-digital (A/D) converter;

supplying said analog composite video image signal to said A/D converter to provide a digital composite video image signal;

providing a band pass filter;

supplying said digital composite video image signal to said band pass filter to provide a chroma signal;

providing a first delay unit of the finite-process-time type having a process time substantially equal to said band pass filter;

supplying said digital composite video image signal to said first delay unit to provide a delayed digital composite video image signal:

providing a Y/C separator; and supplying said chroma signal and said delayed digital composite video image signal to said Y/C separator to provide a luminescence signal.

5. The method of claim 4 further including the steps of:

providing a Hilbert filter;

supplying said chroma signal to said Hilbert filter to provide a 90 degree phase-shifted signal;

providing a second delay unit of the finite-process-time type;

supplying said chroma signal to said second delay unit to provide a delayed chroma signal;

providing a chromatic decoder;

supplying said delayed chroma signal and said phase-shifted signal to said chromatic decoder to provide a pair of color difference signals.

6. The method of claim 5 further including the steps of:

providing a matrix operator;

supplying said luminescence signal, and said pair of color difference signals to said matrix operator to provide a RGB color signal.

7. The method of claim 5 further including the steps of:

utilizing said chromatic decoder to perform a Z transform on said chroma signal and said phase-shifted signal.

8. Transceiver apparatus for receiving an analog composite video image signal and responsively providing an analog image signal of SSTV format for transmission over a narrow band-width analog audio communication channel, and also for receiving such an analog image signal of SSTV format and responsively providing an analog composite video image signal, said apparatus comprising:

an input level controller receiving said analog image signal of SSTV format, said input level controller including means for responsively providing an output analog SSTV image signal within a selected signal range;

an anti-aliasing low-pass filter receiving said output analog SSTV image signal within a certain range, said anti-aliasing low-pass filter including means for rejecting aliasing signals therefrom and responsively providing an output analog SSTV image signal within a certain range and free of aliasing signals;

further including an analog-to-digital (A/D) signal converter, switch means for routing a selected one of said composite video image signal or said analog SSTV image signal within a certain range and free of aliasing signals to said A/D converter, said A/D converter including means for receiving said analog signals and for responsively providing a respective digital version of each signal;

a digital signal processor;

memory means associated with said digital signal processor for storing said digital versions of said analog composite video image signal and of said analog SSTV image signal within a certain range and free of aliasing signals;

wherein said digital signal processor includes:

a Hilbert filter receiving said digital version of said SSTV image signal to effect a phase-shift Hilbert transform of said digitized SSTV signal, said Hilbert filter providing a digital phase-shifted SSTV signal having a certain time delay;

a delay unit having a delay interval substantially equal to said certain time delay, said delay unit providing a time-delayed SSTV signal; and a phase detector for detecting the phase difference corresponding with the angular frequency of said digitized SSTV signal according to the arctangent between said phase-shifted SSTV signal and said time-delayed SSTV signal.

9. The transceiver apparatus of claim 8 wherein said digital signal processor further includes:

a second phase detector receiving said phase-shifted SSTV signal;

a second delay unit receiving said phase-shifted SSTV signal to provide a time-delayed phase-shifted SSTV signal having a delay therein substantially equal to that of said second phase detector; and means for performing a Z transform using said phase-shifted SSTV signal and said time-delayed phase-shifted SSTV signal.

10. Transceiver apparatus for receiving an analog composite video image signal and responsively providing an analog image signal of SSTV format for transmission over a narrow band-width analog audio communication channel, and also for receiving such an analog image signal of SSTV format and responsively providing an analog composite video image signal, said apparatus comprising:

an input level controller receiving said analog image signal of SSTV format, said input level controller including means for responsively providing an output analog SSTV image signal within a selected signal range;

an anti-aliasing low-pass filter receiving said output analog SSTV image signal within a certain range, said anti-aliasing low-pass filter including means for rejecting aliasing signals therefrom and responsively providing an output analog SSTV image signal within a certain range and free of aliasing signals;

further including an analog-to-digital (A/D) signal converter, switch means for routing a selected one of said composite video image signal or said analog SSTV image signal within a certain range and free of aliasing signals to said A/D converter, said A/D converter including means for receiving said analog signals and for responsively providing a respective digital version of each signal;

further including:

a digital signal processor;

memory means associated with said digital signal processor for storing said digital versions of said analog composite video image signal and of said analog SSTV image signal within a certain range and free of aliasing signals; and wherein said digital signal processor further includes:

a band pass filter receiving said digital version of said composite video image signal to provide a chroma signal;

a first delay unit of the finite-process-time type having a process time substantially equal to said band pass filter, said first delay unit receiving said digital version of said composite video image signal to provide a delayed digital composite video image signal; and a Y/C separator receiving said chroma signal and said delayed digital composite video image signal to provide a luminescence signal.

11. The transceiver apparatus of claim 10 wherein said digital signal processor further includes:

a Hilbert filter receiving said chroma signal to provide a 90-degree phase-shifted signal;

a second delay unit of the finite-process-time type receiving said chroma signal to provide a delayed chroma signal;

a chromatic decoder receiving said delayed chroma signal and said phase-shifted signal to said chromatic decoder to provide a pair of color difference signals.

12. The transceiver apparatus of claim 11 wherein said digital signal processor further includes:

a matrix operator receiving said luminescence signal and said pair of color difference signals to provide a RGB color signal by matrix operation with said received signals.

13. The transceiver apparatus of claim 12 wherein said digital signal processor further includes said chromatic decoder including means for performing a Z transform on said chroma signal and said phase-shifted signal.

14. Transceiver apparatus for receiving an analog image signal of SSTV format and responsively providing an analog composite video image signal, said apparatus comprising:

an analog-to-digital (A/D) signal converter receiving said analog SSTV image signal to responsively providing a respective digital version of said signal;

a digital signal processor for receiving said digital version of said SSTV image signal and responsively providing a digital version of said analog composite video image signal;

memory means associated with said digital signal processor for storing said digital version of said analog SSTV image signal and said digital version of said analog composite video image signal;

digital-to-analog signal converter for receiving said digital version of said analog composite video image signal and responsively providing said analog composite video image signal;

wherein said digital signal processor includes:

a Hilbert filter receiving said digital version of said SSTV image signal to effect a phase-shift Hilbert transform of said digitized SSTV signal, said Hilbert filter providing a digital phase-shifted SSTV signal having a certain time delay;

a delay unit having a delay interval substantially equal to said certain time delay, said delay unit providing a time-delayed SSTV signal; and a phase detector for detecting the phase difference corresponding with the angular frequency of said digitized SSTV signal according to the arctangent between said phase-shifted SSTV signal and said time-delayed SSTV signal.

15. The transceiver apparatus of claim 14 wherein said digital signal processor further includes:

a second phase detector receiving said phase-shifted SSTV signal;

a second delay unit receiving said phase-shifted SSTV signal to provide a time-delayed phase-shifted SSTV signal having a delay therein substantially equal to that of said second phase detector; and means for performing a Z transform using said phase-shifted SSTV signal and said time-delayed phase-shifted SSTV signal.

16. Transceiver apparatus for receiving an analog composite video image signal and responsively providing an analog image signal of SSTV format for transmission over a narrow band-width analog audio communication channel, said apparatus comprising:

a buffer amplifier receiving said analog composite video image signal;

an analog-to-digital (A/D) signal converter receiving said analog composite video image signal to responsively provide a respective digital version of said signal;

a digital signal processor receiving said digital version of said composite video image signal and responsively providing a digital version of said SSTV image signal;

memory means associated with said digital signal processor for storing said digital version of said analog composite video image signal and of said SSTV image signal;

a digital-to-analog signal converter for receiving said digital version of said SSTV image signal and responsively providing said analog SSTV image signal;

wherein said digital signal processor includes:

a band pass filter receiving said digital version of said composite video image signal to responsively provide a chroma signal;

a first delay unit of the finite-process-time type having a process time substantially equal to said band pass filter, said first delay unit receiving said digital version of said composite video image signal to provide a delayed digital composite video image signal; and a Y/C separator receiving said chroma signal and said delayed digital composite video image signal to responsively provide a luminescence signal.

17. The transceiver apparatus of claim 16 wherein said digital signal processor further includes:

a Hilbert filter receiving said chroma signal to provide a 90-degree phase-shifted signal;

a second delay unit of the finite-process-time type receiving said chroma signal to provide a delayed chroma signal; and a chromatic decoder receiving said delayed chroma signal and said phase-shifted signal to said chromatic decoder to provide a pair of color difference signals.

18. The transceiver apparatus of claim 17 wherein said digital signal processor further includes:

a matrix operator receiving said luminescence signal and said pair of color difference signals to provide a RGB color signal by matrix operation with said received signals.

19. The transceiver apparatus of claim 17 wherein said digital signal processor further includes said chromatic decoder including means for performing a Z transform on said chroma signal and said phase-shifted signal.

\* \* \* \* \*